3,447,893
OXIDATION CATALYSTS
Ruth E. Stephens, Detroit, Daniel A. Hirschler, Jr., Birmingham, and Frances W. Lamb, Orchard Lake, Mich., assignors to Ethyl Corporation, New York, N.Y., a corporation of Virginia
No Drawing. Continuation-in-part of application Ser. No. 379,720, July 1, 1964. This application Feb. 4, 1966, Ser. No. 525,126
Int. Cl. B01d 57/00; B01j 11/46
U.S. Cl. 23—2                                                                    8 Claims

ABSTRACT OF THE DISCLOSURE

Hydrocarbon and carbon monoxide content of exhaust gas from internal combustion engines are reduced by contacting the exhaust with a catalyst consisting of copper oxide or copper oxide promoted with silver, cobalt or vanadium oxides on an alumina support.

---

This application is a continuation-in-part of application Ser. No. 379,720, filed July 1, 1964, which in turn is a continuation-in-part of application Ser. No. 99,380, filed Mar. 30, 1961, now abandoned, which in turn is a continuation-in-part of application Ser. No. 26,699, filed May 4, 1960, now abandoned.

This invention relates to novel catalysts. More particularly, it relates to a method for the oxidation of hydrocarbons and carbon monoxide which are present in the exhaust gas of internal combustion engines.

The exhaust gas of internal combustion engines is composed mainly of the complete oxidation products of the fuel—carbon dioxide and water—and the nitrogen from the air which was fed to the combustion chamber. Relatively minor constituents are oxygen, oxides of nitrogen and sulfur, carbon monoxide and unburned and partially oxidized hydrocarbons. Of this latter group, it is particularly desirable to reduce the concentration of carbon monoxide and of the unburned and partially oxidized hydrocarbons. Carbon monoxide is poisonous and is particularly dangerous because it is difficult to detect, being colorless and essentially odorless. Hydrocarbons, though in themselves somewhat less toxic and harmful, can be asphyxiants if consumed in large volumes. More important is their tendency, by reacting with other atmospheric constituents, to substantially contribute to air pollution. One form of air pollution, a haze-like formation, has been evidenced in certain large cities and is referred to as photochemical smog.

The quality and quantity of unburned and partially oxidized hydrocarbons and carbon monoxide varies widely dependent upon vehicle operating conditions and the conditions of maintenance of the engine. For example, under idle conditions the concentration of unburned hydrocarbons in the exhaust gas may be as low as 300 parts per million; whereas, under decelerating conditions the concentration may be over 5,000 parts per million. Moreover, depending on operating conditions, a variety of partial oxidation products are present in the exhaust gas stream. The failure of just one spark plug to fire will greatly increase the emission of these noxious products.

Various devices have been proposed to treat the exhaust gas stream so as to eliminate the deleterious constituents. Experimental devices such as catalytic converters, afterburners, absorbers (liquid washing devices), porous solid absorbers, condensers, etc., have shown varying degrees of effectiveness. The inherent problems with each device are such that none has achieved commercial success. For example in designing an exhaust gas afterburner the problems of maintaining a flame under all operating conditions, and constructing a unit sufficiently small to be installed in modern passenger automobiles have not yet been satisfactorily solved. With liquid washing devices, the large volume and contact time required results in a system much too large to be feasible. Likewise, with adsorbing materials and condensers, problems of the size and efficiency of the system are formidable.

Suggestions of several catalytic converter systems for this application are to be found in the prior art. With such systems, the exhaust gases are passed over a catalytic bed wherein the noxious materials are converted to an inactive form. However, none of these systems substantially meets the requisites of a satisfactory catalytic converter. Among the major requisites for a system employing a catalyst to oxidize the deleterious materials found in exhaust gas streams of automobiles are the following:

(1) Oxidation of substantial amounts of hydrocarbons and carbon monoxide.

(2) The oxidation should be complete, as intermediate products undergo further reactions with other atmospheric constituents and thereby substantially contribute to smog formation.

(3) The discharged exhaust gas should be free of noxious odors.

(4) The catalyst should be active at relatively low temperatures and thermally stable at relatively high temperatures.

(5) It must operate effectively under a wide variety of conditions as hydrocarbon and carbon monoxide content of exhaust gas varies tremendously, depending on whether the car is idling, accelerating, cruising, or decelerating.

(6) It must be particularly resistant to catalytic poisons.

(7) It must be highly resistant to poisonous effects of the oxidation products of the many constituents found in gasoline.

(8) It should preferably not oxidize nitrogen.

The formidable nature of a solution to this problem is better understood by considering the severe environment to which an exhaust gas catalyst is subjected. The catalyst must operate efficiently under a wide temperature range—as low as 400 to 500° F. and preferably lower, and at temperatures as high as 1800° F. It must operate efficiently on the exhaust stream produced from a variety of gasolines burned in a variety of vehicles under a variety of conditions.

In addition to exhaust gases produced by "older type gasolines"; that is, gasoline predominantly composed of aliphatic straight run components, the exhaust device is subjected to the combustion products of modern gasolines. The combustion products of modern gasolines produce a much more severe environment for the catalyst as compared to the exhaust streams produced by older type gasolines. Whereas older gasolines were composed mainly of saturate hydrocarbons producing a somewhat uniform exhaust stream, modernly, gasolines contain a variety of hydrocarbons including high percentages of catalytically produced constituents. These include cracked, reformed, isomerized, and polymerized hydrocarbons. Moreover, modern gasolines contain a multitude of non-hydrocarbon additives designed to effectuate a high degree of combustion efficiency.

In addition, lubricating oils, which often find their way into the combustion chamber and are discharged with the exhaust gas stream also contain non-hydrocarbon additives. It is, therefore, not uncommon that in modern practice an exhaust gas stream will contain the combustion products of compounds containing phosphorus, boron, manganese, sulfur, bromine, chlorine, zinc, calcium, iron, and others. It is well known that many of these elements and their compounds are potential catalyst poisons. Several of these poisons may be taken into consideration when designing a catalyst to be used in a normal chemical process. Indeed, for an exhaust gas application many catalyst systems have been discovered which are resistant to several of these contaminants, only to be subject to poisoning by others. Alternatively, in the chemical plant the feed gases may be scrubbed to remove the deleterious constituents. However, because of the required simplicity and economy of space, these alternatives are not practical in an exhaust gas application. Therefore, a practical solution to this problem requires a catalyst which is relatively immune to all the various contaminants present in exhaust gas streams emitted by the modern vehicle.

It is an object of this invention to provide unique catalysts. A further object is to provide catalysts which are particularly resistant to the potential catalyst poisons found in the exhaust gas stream of modern vehicles. A further object is to provide a method of oxidizing substantial amounts of the unburned hydrocarbons and carbon monoxide found in the exhaust gas stream of modern internal combustion engines.

According to the present invention, we provide novel catalysts particularly adapted for conversion of exhaust gas components, said catalysts consisting essentially of a "transitional" activated alumina which has been impregnated, or with which has been mixed, copper oxide in amount such that the catalyst system contains between 0.5 and 25 weight percent of copper as said oxide. The present invention also embodies the method of substantially eliminating and converting unburned hydrocarbons and carbon monoxide from the exhaust stream of internal combustion engines, which comprises passing said exhaust over and through the above catalysts.

In another embodiment of this invention, we provide novel copper catalysts containing one or more promoter metals selected from the group consisting of silver, cobalt and vanadium to improve catalyst performance. The promoter metal(s) may be present in a concentration of from about 0.1 to 10 percent by weight.

We have found the combination of "transitional" aluminas and copper oxide to be critical. In other words, our catalysts are superior to those prepared using "transitional" alumina but using other metals in place of copper, and superior to copper catalysts wherein other catalyst carriers are used in place of the "transitional" aluminas employed in this invention.

By the use of our invention, substantially all of the carbon monoxide is converted to carbon dioxide and a great percentage of the unburned hydrocarbons are completely oxidized to carbon dioxide and water. Further, the catalysts of this invention are active over a wide temperature range and under a variety of engine operating conditions. Other important aspects of our catalysts are: excellent thermal stability at extremely high temperatures; they do not catalyze the oxidation of nitrogen; and they function substantially independently of sulfur content of the gasoline. One of the important properties of the present catalysts is their resistance to the many catalyst poisons in exhaust gas. An outstanding feature is their resistance to the poisoning effects of the many sulfur compounds found in commercial gasolines. The oxidation products of sulfur are well known catalyst poisons. Many materials otherwise suited as catalysts are adversely affected by the oxidation products of sulfur, losing activity with use and eventually being rendered inactive.

Particular attention is called to the alumina used as the carrier material in the catalysts of this invention. Generally, the carrier material serves as a support or a binder for the active catalytic agent, but in itself has little, if any, catalytic activity for the reaction in question. Other mechanical functions might be to impart physical strength and to serve as an aid in the dissipation of heat to prevent sintering. For such purposes, any one of the well known carrier materials may be equally effective. Aside from purely mechanical functions, a carrier material may serve to give a larger exposure of the catalytic agent, increase thermal stability, modify catalytic selectivity and provide increased resistance to poisoning of the active agent. Also a complex formation may take place between the carrier and the active agent which results in an overall material having better catalytic properties per unit area than the active agent alone. It is because of these non-purely mechanical functions that a carrier material may be specific for a given catalytic agent with respect to a particular reaction; that is, although a catalytic agent on one carrier material may be an excellent catalyst for a specific reaction, it may behave entirely differently and be a poor catalyst if supported by a different carrier material.

We have found that copper oxide on a particular type of transitional alumina, to be described below, is an excellent catalyst for the oxidation of unburned hydrocarbons and carbon monoxide in the exhaust gas streams of internal combustion engines. However, catalysts composed of copper oxide on other well known catalyst carriers and, indeed, even on other types of aluminas, result in inferior catalysts. In other words, a particular type of transitional alumina is specific for copper oxide for the oxidation of the hydrocarbons and carbon monoxide found in the exhaust stream of internal combustion engines.

In general, the transitional aluminas used in this invention are prepared by heating a starting alumina selected from the class consisting of alpha alumina trihydrate, beta alumina trihydrate and alpha alumina monohydrate to a temperature of at least 100–150° C. for a period of time sufficient to permit substantial conversion to a transitional alumina but insufficient to convert a substantial fraction of the transitional aluminas irreversibly to the inactive alpha alumina. Heating alpha alumina trihydrate leds to the formation of partially amorphous and partially crystalline transitional aluminas consisting essentially of a mixture of chi, alpha monohydrate and amorphous forms of alumina, as described in "Alumina Properties," by Allen S. Russell et al., Aluminum Company of America, Pittsburgh, Pa., 1956. The controlled calcination of beta alumina trihydrate leads to mixtures of alpha alumina monohydrate and eta alumina. In general, prolonged heating above about 1000° C. should be avoided. Our carriers in some cases may contain small amounts of either the starting material or alpha aluminas, or both.

The preferred transitional aluminas which we use are those whose surface area/mass ratio is at least 75 square meters per gram (m.$^2$/g.) and those having a silica content of from 0.01 to about 5 percent. If the surface is greater than the above minimum but the silica content greater than the above maximum, the alumina does not function well. By the same token, if the silica content is from 0.01 to about 5 percent, but the surface area is below 75 m.$^2$/g., the alumina does not function as efficiently.

In illustration of the importance of the above properties, we have tested aluminas with surface areas as high as 350 m.$^2$/g. but with a silica content greater than 5 percent. These have resulted in catalysts with inferior properties with respect to exhaust gas conversion. Also, an alumina with a silica content less than 5 percent but with a surface area of only 0.5 m.$^2$/g. was ineffective as a support for copper oxide.

Certain aluminas meeting the requisites of this invention are commercially available. Included in these are those sold by Aluminum Company of America as "Dessicant Grade Active Aluminas; Grade F–1, F–3 and F–10" and by Kaiser Aluminum Company as "KA–101."

Analyses and physical properties of typical aluminas of this invention are:

Chemical analysis—

| | | |
|---|---|---|
| $Al_2O_3$ | percent | 85.0–95.4 |
| $Na_2O$ | do | 0.4–2.0 |
| $Fe_2O_3$ | do | 0.02–0.15 |
| $SiO_2$ | do | 0.02–5 |
| Loss on ignition, 1100° C. | do | 4.2–8.5 |

Physical properties—

| | | |
|---|---|---|
| Surface area | m.²/g | 75–360 |
| Form | | Granular or balls |
| Bulk density | lb./ft.³ | 43–57 |
| Specific gravity | | 3.1–3.3 |
| Pore volume | ml./g | 0.25–0.3 |
| Pore diameter | A | 40–50 |
| Dynamic sorption | percent | 11–23 |
| Crushing strength | do | 55–66 |

One method of large-scale preparation of the alumina carriers of this invention is as a by-product of the Fickes-Sherwin modification of the Bayer process in the manufacture of metallic aluminum. During the process, aluminum trihydrate is precipitated from alkali aluminate solutions. This material, a scale-like deposit, is then crushed or ground, and calcined at a temperature between 300 and 800° C. The finished material is used primarily as a commercial adsorbent. It does not readily pack, can be used in high pressure application, and after use, can be readily regenerated.

The granular macroparticles of alumina we use as the carrier material for our catalysts may be from about 2.5 to 8 mesh (Tyler Standard Screen Scale Sieves). However, we have found materials of from 4 to 6 mesh to be optimum for this exhaust gas application.

An important property of any catalyst is its resistance to attrition and abrasion. This is particularly true with an automobile exhause application because of the continual agitation and physical shocks to which the catalyst bed is subjected. While the granular form of transitional alumina is an excellent material for this application, we have found that the spherical form is particularly resistant to attrition and abrasion. An example of the spherical form of transitional alumina is that sold by the Kaiser Aluminum Company as "Activated Alumina KA-101." This material is prepared by the controlled calcination of beta trihydrate, and its finished form is composed mainly of eta alumina and alpha monohydrate. The final product has low silica and titanium dioxide content, 0.02 percent and 0.002 percent, respectively. Its high surface area and extreme resistance to abrasion make it admirably suited for an exhaust gas application. The material has a hard uniform surface, crushing strength of 66 percent, and excellent thermal stability properties. The sphericity of the active alumina balls eliminates or reduces to a minimum the chipping which is evident when using a bed consisting of a granular material. Moreover, the uniform sphericity reduces packing and channeling, resulting in lower pressure drop as compared to a granular catalyst bed. Active aluminas of from about 1/16 to 3/8 inch diameter or mixtures of alumina spheres in this range are suitable for this application. However, we prefer to use those ranging in size from 1/8 to 1/4 inch. Thus, a preferred embodiment of this invention is a catalyst especially suited for exhaust gas conversion, said catalyst consisting of spherical form transitional alumina of from 1/16 to 3/8 inch, preferably from 1/8 to 1/4 inch in diameter; said alumina having a surface area of at least 75 m.²/g. and containing from 0.01 to 5 percent silica, and being mixed or impregnated with from 0.5 to 25 percent copper in an oxide form.

We further prefer, under certain conditions of operation, to use in the same catalyst bed copper oxide impregnated on two or more forms of transitional alumina. Some spherical forms of alumina may have superior properties with respect to attrition whereas some granular forms may be superior with respect to oxidation efficiency. By using both forms of alumina the advantages of resistance to attrition and abrasion of the spherical form and the superior oxidation efficiency of the granular form are combined. The different forms of aluminas may be mixed prior to catalyst preparation or jointly impregnated and decomposed to form the finished catalyst.

Also, the two catalysts may be prepared independently and mixed after final preparation. The two forms of catalysts may be mixed randomly to form the bed or they may be stratified, horizontally or vertically. The front portion of the bed may be composed of one form and the rear portion of the other form, and vice versa. We prefer to have the front portion of the bed composed of a catalyst prepared by using a spherical form of alumina and the rear part of the catalyst using the granular form of the alumina as the carrier. By this technique the pulsating and abrasive effect of the entering gas stream is eliminated or reduced to a minimum, being absorbed by the more resistant spherical form and the overall efficiency of the bed is maintained at a high level by the more efficient granular form which composes the rear part of the bed. Thus, another preferred embodiment of this invention is a catalyst especially suited for exhaust gas conversion wherein the forward 2 to 40 percent portion of the catalyst bed consists of a catalyst using as a carrier material a spherical form of transitional alumina of from 1/16 to 3/8, preferably from 1/8 to 1/4 inch in diameter and the rear 60 to 98 percent portion of said catalyst bed consists of a catalyst prepared by using a granular transitional alumina of from 2.5 to 8, preferably from 4 to 6 mesh, both said spherical form and granular form of transitional alumina having a surface area of at least 75 m.²/g. and from 0.01 to 5 percent silica, both said transitional aluminas being impregnated with from 0.5 to 25 percent copper in an oxide form We have also found that the inclusion of a small amount of a promoter metal selected from the group consisting of silver, cobalt and vanadium further enhances the properties of our catalysts. In some cases, we prefer to use more than one of these promoter metals. The additional metal or metals act as a 'promoter;" that is, though in themselves they may have little activity, they impart better characteristics to the finished catalysts. We have found that the inclusion of up to about 10 percent, based on the total weight of the catalyst-carrier system, of the promoter metal or metals improves efficiency and life of the catalysts of this invention. The promoter metal in the finished catalyst is usually in an oxide form but in some cases, e.g., silver, it may exist as the free metal. The promoter metals may be introduced before or during preparation of the catalysts as salts such as the nitrate, acetate, carbonate, and the like, or in the form of oxides or hydroxides, or even as the finely divided metal itself. Another method is to impregnate a finished copper oxide-alumina catalyst with a promoter metal in one or more of the above forms.

The catalysts of this invention may be prepared in a variety of ways. They may be prepared by contacting the activated transitional alumina with a solution, not necessarily aqueous, of an organic or inorganic compound of copper and, when used, the promoter metal, allowing sufficient time for impregnation, and then subjecting the mass to appropriate conversion treatment. The conversion consists of thermal treatment to remove free water from the system, to convert the copper to the oxide form, and to convert the promoter metal to its active form. A great variety of specific conversion techniques are well known to those skilled in the art. If it is desired to impregnate the alumina with both a catalytic agent and a promoter, the alumina can be contacted successively with a solution of each metal in either order, or with one solution containing both metals. The catalysts can be prepared from copper nitrates, carbonates, acetates, sulfates, hydroxides, lactates, formates, acetates, oxalates, propionates, benzoates, and the like. The same general types of salts are useful for impregnating the substrate with a polymer metal or metals when a promoter is desired. True organo-copper compounds such as cyclopentadienyl copper triethylphosphine, bis ethylamino methylene acetone copper II, bis acetyl acetonate, and the like, can be used. Other methods of preparing mixtures of transitional aluminas and copper oxides can also be used. For example, the copper oxide may be incorporated into the transitional alumina during the conversion of the starting alumina to the transitional form.

A preferred method of making our catalyst constitutes starting with a copper salt or oxide and forming an ammonical solution whereby a deeply violet-colored copper ammonium complex is formed. The transitional alumina is then impregnated with the copper complex and gradually heated. The copper complex is decomposed to yield the active copper oxide form. We have found that the catalysts prepared by this method are superior to catalysts prepared by more conventional methods. Among other advantages, this method allows greater amounts of copper to be put in solution per unit volume.

A particularly convenient and desirable method of producing our catalysts, which constitutes our preferred method, is starting with basic copper carbonate, usually either the malachite or azurite form or a mixture of both. When this material is mixed with a solution of ammonium carbonate and ammonia, a deeply violet-colored copper ammonium carbonate complex is formed. The transition alumina can then be impregnated with the copper complex, which is then easily decomposed to copper oxide by heating. We have found that catalysts produced in this manner are superior to those made by other methods of preparation. Such catalysts have the advantages of being more resistant to attrition and of having better stability and longer life. Moreover, problems such as solubility of starting materials, corrosion to equipment during preparation, and poisonous fumes encountered with some other methods of preparation are eliminated. Our preferred method, besides producing superior catalysts, has the advantages of starting with relatively inexpensive materials, being able to produce a highly concentrated solution of the copper complex, and the ease of decomposing the complex to the active copper oxide form.

The following examples are not meant to limit the methods of making our catalysts, but to show some of our preferred methods.

EXAMPLE I

The transitional alumina used in this example contains about 92 percent $Al_2O_3$, about 0.8 percent $Na_2O$, about 0.12 percent $Fe_2O_3$, and about 0.09 percent $SiO_2$. On ignition it loses about 6.0 percent of its weight. It is a granular material having a surface/mass ratio of about 210 m.$^2$/g. Its bulk density (packed) is about 55 lb./ft.$^3$, and its specific gravity is about 3.3. It was prepared by calcination of alpha alumina trihydrate and contains a mixture of chi, alpha monohydrate and amorphous forms of alumina. Basic copper carbonate, $CuCO_3 \cdot Cu(OH)_2$, is mixed with a solution of ammonia and ammonium carbonate, a deeply violet-colored mixture being formed. The mixture contains a solution of copper ammonium carbonate $[Cu(NH_3)_4]^{++}CO_3^=$. The alumina is immersed in a volume of this solution barely sufficient to cover its bulk. The material is then allowed to stand for a sufficient time to thoroughly impregnate with the solution. Then the temperature of the mixture is gradually raised to drive-off water, carbon dioxide and ammonia. During the heating, the copper ammonium carbonate decomposes to an oxide or mixture of oxides of copper. The finished material is a transitional alumina containing about 0.1 percent silica and impregnated with oxides of copper. In this example the finished catalyst contained 0.5 percent copper. This concentration is controlled by the relative amounts of alumina and basic copper carbonate used in the preparation.

EXAMPLE II

The procedure of Example I is followed but the amount of basic copper carbonate used is such that the finished catalyst is composed of 25 percent copper in an oxide form.

EXAMPLE III

The transitional alumina of Example I is immersed in a solution of copper acetate and allowed to stand. The temperature of the solution is then gradually raised to drive-off all the free water. At this point the alumina pellets are coated with copper acetate and have a slightly moist texture. The mixture is then spread on a surface which is heated to above the decomposition temperature of copper acetate. A draft of air or inert gas is then passed over the material. During the heating the copper acetate decomposes to an oxide or mixture of oxides of copper. In this example the finished catalyst contains 5 percent copper in an oxide form.

EXAMPLE IV

A transitional alumina compound of alpha alumina monohydrate, amorphous alumina and small quantities of gamma and theta transitional alumina containing about 0.09 percent silica is mixed with a solution of basic copper carbonate, ammonia, ammonium carbonate and silver acetate. The procedure of Example I followed. The finished catalyst is transitional alumina containing about 0.09 percent silica impregnated with oxides of copper and silver, comprising by weight 7 percent copper and one percent silver.

EXAMPLE V

A catalyst is prepared by impregnating a transitional alumina using a solution of copper acetate and ammonium metavanadate and oxalic acid such that the finished catalyst comprises trnsitional alumina impregnated with oxides of copper and vanadium, comprising by weight 9 percent copper and one percent vanadium in an oxide form. This transitional alumina is made by conversion of a mixture of alpha and beta alumina trihydrate and contains substantially all the transitional aluminas, including amorphous lumina and alpha alumina monohydrate in addition to about 5 percent silica.

EXAMPLE VI

The transitional alumina used in this example contains about 95.4 percent $Al_2O_3$, about 0.02 percent $SiO_2$, about 0.02 percent $F_2O_3$, about 0.002 percent $TiO_2$, and 0.40 percent $Na_2O$. On ignition it loses about 4.2 percent of its weight. It is a spherical form of transitional alumina having a surface area of about 360 m.$^2$/g. Its bulk density is about 43 lb./ft.$^3$ and has a dynamic sorption of about 19.7 percent. Its crushing strength is 66 percent. It is prepared by the carefully controlled calcination of beta trihydrate and its principal constituents are eta and alpha monohydrate forms of alumina. One-sixteenth inch diameter spheres are immersed in a solution of copper acetate and the procedure of Example III is followed. In this example the finished catalyst is $\frac{1}{16}$ inch diameter spherical form of transitional alumina containing about 0.02 percent silica and impregnated with 6 percent copper in an oxide form.

EXAMPLE VII

The procedure of Example VI is followed, but the carrier material for this catalyst is a spherical form of transitional alumina prepared by the controlled calcination of beta alumina trihydrate and comprising the eta and alpha monohydrate forms of transitional aluminas having a diameter of approximately $\frac{3}{8}$ inch and containing about 0.02 percent silica. The amount of copper acetate solution used in this example was such that the finished catalyst contained 12 percent by weight of copper in an oxide form.

EXAMPLE VIII

In this example the catalyst bed is composed of copper oxide impregnated on both granular and spherical forms of alumina. The forward 2 percent portion of the catalyst bed is composed of the catalyst of Example VI and the after 98 percent portion of the bed is composed of the catalyst of Example III.

EXAMPLE IX

In this example the catalyst bed is composed of copper oxide impregnated on both granular and spherical forms of alumina. The forward 40 percent portion of the bed is composed of the catalyst of Example VII and the after 60 percent portion of the bed is composed of the catalyst of Example I.

EXAMPLE X

A transitional alumina, containing about 0.5 percent silica prepared by the controlled calcination of beta-alumina trihydrate and comprising the eta and alpha-monohydrate forms of transitional aluminas, passing through a 5 mesh (Tyler Standard Screen Scales Sieve) and retained by an 8 mesh is immersed in a solution of cobalt nitrate and copper nitrate. The mixture is allowed to stand so that the alumina is thoroughly impregnated with the nitrate solution. The temperature of the solution is then gradually raised to evaporate all the fresh water. The impregnated alumina is then spread on a surface which is heated up to about 500° C. in the presence of a draft of air. During the heating the copper nitrate and cobalt nitrate decompose to form oxides of the respective metals. In this example, based on metallic weight, the finished catalyst contains 8 percent copper and 5 percent cobalt in an oxide form.

EXAMPLE XI

Basic copper carbonate, $CuCO_3 \cdot Cu(OH)_2$, is mixed with a solution of ammonia and ammonium carbonate, a deeply violet-colored mixture being formed. Cobalt carbonate is dissolved in the solution. The resulting solution is mixed with a solution of ammonium metavanadate and oxalic acid. A transitional alumina, containing about 0.02 percent silica and prepared by the controlled calcination of beta alumina trihydrate and comprising the eta and alpha monohydrate forms of transitional aluminas, is immersed in a volume of this solution so as to cover its bulk. After a sufficient time to allow thorough impregnation, the mixture is gradually heated to drive-off water, carbon dioxide, and ammonia. Heating is continued up to a temperature of about 550° C. During the heating, the copper, cobalt, and vanadium salts decompose to oxide forms. The finished catalyst is a transitional alumina containing about 0.02 percent silica and impregnated with oxides of copper, cobalt and vanadium. In this example, the finished catalyst contained 8 percent copper, 4 percent cobalt and 0.5 percent vanadium.

EXAMPLE XII

The procedure of Example XI is followed with the exception that the ammonium metavanadate-oxalic acid solution is omitted. After decomposition, the finished catalyst contains 4 percent copper and 1.5 percent cobalt.

EXAMPLE XIII

The procedure of Example XI is followed but the quantity of starting materials is such that the final catalyst comprises 9 percent copper and 6 percent cobalt, both in oxide forms.

Several catalysts of this invention and a variety of other catalysts were tested using the exhaust gas of a CFR L-Head 7:1 compression ratio, single cylinder engine. As a preliminary test, the exhaust gas was split into two streams and two different catalysts were tested simultaneously. Each stream was passed over a catalyst bed consisting of 42 cubic inches of a catalyst material. A secondary air supply to provide oxygen for the oxidation was introduced into the exhaust gas stream just prior to the catalyst bed. This air supply was constant throughout the testing period. In a subsequent test the total exhaust gas from the engine, together with some secondary air, was passed over a catalyst bed consisting of 86 cubic inches of the catalyst material. During both tests the engines were continually cycled, 50 seconds under idling conditions, and 150 seconds at wide-open throttle. The operating conditions for the two tests are as follows:

TABLE I.—ENGINE OPERATING CONDITIONS

|  | 42 cu. in. catalyst bed test | | 86 cu. in. catalyst bed test | |
| --- | --- | --- | --- | --- |
|  | Idle | Wide-open throttle | Idle | Wide-open throttle |
| Engine speed, r.p.m. | 750 | 1,140 | 750 | 1,140 |
| Volume of exhaust gas s.c.f.h. | 90 | 250 | 180 | 500 |
| Volume of secondary air s.c.f.h. | 40 | 40 | 80 | 80 |
| Hydrocarbon (vol. percent) | 0.04 | 0.03 | 0.04 | 0.03 |
| $CO_2$ | 4 | 10 | 4 | 10 |
| CO | 7 | 3 | 7 | 3 |
| Space velocity (v./v./hr.) | 5,350 | 11,900 | 5,200 | 11,600 |

The composition of the fuel on which the engine was operated during this test is as follows:

Fuel composition

ASTM distillation— ° F.
    Initial boiling point _____ 97
    10 percent evaporated _____ 148
    50 percent evaporated _____ 236
    90 percent evaporated _____ 327
    Final boiling point _____ 422
Hydrocarbon type, volume percent—
    Aromatics _____ 40
    Olefins _____ 4
    Saturates _____ 56
Sulfur, weight percent _____ 0.12
TEL contents, g. of Pb/gal. as tetraethyllead _____ 12.0

During the entire test, the engine was operated under the conditions shown in Table I. The hydrocarbon and carbon monoxide concentrations of the exhaust stream were measured before and after passage through the catalyst bed. The oxidation efficiencies of seven catalysts during this test were determined. The following Table II describes the catalysts used in this test.

TABLE II

Catalyst I—10 percent vanadium pentoxide on high surface (350 m.²/g.) transitional alumina (40 percent alpha-alumina monohydrate and 50 percent gamma alumina) in the form of ⅛ inch spheres and containing 6.3 weight percent silica.

Catalyst II—12 percent copper in oxide form on high surface (350 m.²/g.) transitional alumina (40 percent alpha-alumina monohydrate and 50 percent gamma alumina) in the form of ⅛ inch spheres and containing 6.3 weight percent silica.

Catalyst III—7 percent copper in oxide form on high surface (210 m.²/g.) transitional alumina (40 percent chi-alumina, 40 percent alpha-alumina monohydrate and 20 percent amorphous alumina prepared from the calcination of alpha-alumina trihydrate) in a 4–6 mesh granular form and containing 0.09 weight percent silica.

Catalyst IV—6.3 percent copper in oxide form and 2.0 percent silver on high surface (210 m.²/g.) transitional alumina (40 percent chi-alumina, 40 percent alpha-alumina monohydrate and 20 percent amorphous alumina prepared from the calcination of alpha-alumina trihydrate) in a 4–6 mesh granular form and containing 0.09 weight percent silica.

Catalyst V—8.0 percent copper in oxide form and 4.0 percent cobalt on high surface (335 m.²/g.) transitional alumina (eta-alumina and alpha-alumina monohydrate) in the form of 6–8 mesh spheres and containing 0.02 weight percent silica.

Catalyst VI—8.0 percent copper in oxide form plus 4.0 percent cobalt plus 1.07 percent vanadium pentoxide on high surface (335 m.²/g.) transitional alumina (eta-alumina and alpha-alumina monohydrate) in the form of 6–8 mesh spheres and containing 0.02 weight percent silica.

Catalyst VII—11.3 percent copper in oxide form plus 23.2 percent chromium as chromium oxide on an alumina support.

The following Table III gives the efficiency of the seven catalysts in terms of percent reduction of the hydrocarbon and carbon monoxide constituents of the exhaust gas.

cobalt and vanadium as promoter metals results in still further improvements of catalyst activity. As compared to the unpromoted catalysts, the cobalt-vanadium promoted catalyst shows greatly improved initial activity with respect to hydrocarbon oxidation and moderate superiority during the latter part of the test with respect to both hydrocarbon and carbon monoxide oxidation. As evidenced by the poor results obtained with catalyst VII, the promoter metal cannot be indiscriminately chosen. As will be shown later, much higher efficiencies are obtained when the catalysts are used to oxidize the exhaust stream of fuels containing a lower amount of tetraethyllead and sulfur.

We have also prepared and tested copper oxide catalysts

TABLE III.—OXIDATION EFFICIENCIES OF VARIOUS CATALYSTS

[Engine operated on gasoline containing 12 grams of lead per gallon as tetraethyllead and 0.12 wt. percent sulfur]

| Test hours | Hydrocarbon reduction, percent | | | | | | |
|---|---|---|---|---|---|---|---|
| | Catalyst I [1] | Catalyst II [1] | Catalyst III | Catalyst IV | Catalyst V | Catalyst VI | Catalyst VII |
| 0 | 57 | 60 | 65 | 69 | 76 | 81 | 61 |
| 25 | 62 | 30 | 64 | 64 | 63 | 70 | 28 |
| 50 | 48 | 0 | 47 | 52 | 43 | 54 | 17 |
| | Carbon monoxide reduction, percent | | | | | | |
| 0 | 16 | 90 | 97 | 100 | 97 | 97 | 87 |
| 25 | ([2]) | 58 | 83 | 80 | 80 | 89 | 20 |
| 50 | ([2]) | 32 | 71 | 73 | 61 | 72 | 20 |

[1] Transition aluminas containing greater than 5 percent silica.  [2] Not determined.

Referring to Table II giving the composition of the seven catalysts, it can be seen that catalysts I and II are not catalysts claimed in this invention. Both of these catalysts are on an alumina support containing over 5 percent silica. Catalyst VII is also not of this invention since it contains copper and chromium in an oxide form. The remaining four catalysts are catalysts of this invention. Table III clearly indicates the superiority of the catalysts of this invention. Compare especially catalysts II and III, which are both copper catalysts on a similar transitional alumina with the exception of silica content. Catalyst III is more efficient at the beginning of the test with respect to both hydrocarbon reduction and carbon monoxide reduction, but its superiority is especially apparent after 50 hours. Catalyst II, after 50 hours, exhibits no catalytic effect on hydrocarbon reduction and has very little effect on carbon monoxide reduction. It is also significant to note that catalyst VII, containing copper and chromium, although showing some activity on hydrocarbons at the beginning of the test, rapidly lost its activity when exposed to the exhaust gas environment. This has been found to be the fate of the vast majority of catalysts selected indiscriminately from metals known to possess some catalytic activity.

With respect to carbon monoxide reduction, our catalysts are vastly superior. This is especially true at the 25 hour test point during the subsequent test period. After 50 hours of test, the catalysts of this invention are at least twice as efficient as any other catalyst. Here, again, it is significant to note that catalyst VII, containing copper and chromium, exhibited a satisfactory degree of activity on carbon monoxide at the start of the test, but after a short exposure to exhaust gas, its activity decreased to less than one quarter its original activity, making it unsuited for exhaust gas applications. The ability of the catalysts of this invention to retain high efficiencies with respect to carbon monoxide reduction is extremely important. The elimination of carbon monoxide is equally as desirable as the elimination of unburned hydrocarbons.

The excellent properties of the copper oxide catalyst can be further enhanced by the inclusion of a promoter metal. As shown in Table III, the copper oxide catalyst promoted with silver oxide has improved properties with respect to the oxidation of both hydrocarbons and carbon monoxide. Greater improvements are obtained by using cobalt as the promoter metal. The combined use of on transitional alumina containing less than 5 percent silica but having a surface area less than 75 m.²/g. Such catalysts proved to be vastly inferior to catalysts using our preferred transitional aluminas having surface areas over 75 m.²/g. The carrier materials we use for our catalysts must be of the transitional type previously described, and preferably contain from 0.01 to about 5 percent silica, and have a surface area greater than 75 m.²/g.

The oxidation efficiencies of the catalysts of this invention were also investigated using the exhaust stream resulting from the use of a typical commercial fuel. A single cylinder engine was operated under the conditions of Table I and the exhaust stream therefrom was passed over an 86 cubic inch catalyst bed. The catalyst contained 7 percent copper in an oxide form on high surface (210 m.²/g.) transitional alumina (40 percent chi-alumina, 40 percent alpha-alumina monohydrate and 20 percent amorphous alumina) in a 4–6 mesh granular form and containing 0.09 weight percent silica. The engine was operated on a fuel containing 3.0 grams of lead as tetraethyllead per gallon and 0.12 weight percent sulfur. The excellent results obtained under these conditions are shown below.

TABLE IV.—OXIDATION EFFICIENCY OF COPPER OXIDE-TRANSITIONAL ALUMINA CATALYST

| Test hours | Hydrocarbon reduction, percent | Carbon monoxide reduction, percent |
|---|---|---|
| 0 | 76 | 100 |
| 25 | 83 | 97 |
| 50 | 82 | 95 |
| 75 | 82 | 93 |
| 100 | 83 | 95 |

Even though the fuel contained the abnormally high 0.12 percent sulfur, this catalyst showed remarkably high efficiencies throughout the 100 hour test period. In fact, the efficiency of the catalyst toward hydrocarbon oxidation after 100 hours of test (83 percent) was higher than it was at the start of test. The efficiency of this catalyst is even more spectacular with respect to carbon monoxide oxidation. After 100 hours of testing, 95 percent of the carbon monoxide was being converted to carbon dioxide.

In addition to the superior catalysts made by the preferred method, namely, impregnating the carrier with an ammoniacal solution of basic copper carbonate, excellent catalysts were also prepared using other techniques. Catalysts prepared by impregnating transitional alumina with an aqueous solution of copper acetate or copper nitrate showed extremely high oxidation efficiencies and a high degree of resistance to the poisoning effects of the oxides of gasoline constituents.

An important feature of the catalysts of this invention is their excellent thermal stability properties. The catalyst bed temperature under normal engine operation may vary from 400 to 1700° F. Under extreme conditions of severe acceleration and deceleration, bed temperatures as high as at least 1750° F. have been observed. Using catalysts of this invention, catalyst beds have been operated at temperatures at least this high without substantially affecting catalytic activity. The property of heat stability is very important because it obviates the necessity of installing a mechanical system to have the exhaust gas bypass the catalyst bed in case of extremely high temperatures. Such a by-pass system would be required if the catalyst were susceptible to damage at high temperatures. Good thermal stability is also desirable in that it allows the reaction to be carried out at higher temperatures wherein higher efficiencies may be attained. Furthermore, this property becomes important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course, this would be possible only if the catalyst could tolerate the higher temperatures due to the insulation.

Still another important feature of the catalysts of this invention is their ability to catalyze reactions at extremely low temperatures. Since catalyst activity generally increases with temperature, in many applications it can be optimized by the simple expediency of increasing reaction temperatures. However, in exhaust gas conversion, temperatures cannot readily be controlled and a rather anomalous requisite of high activity at both low and high temperatures is imposed. The catalysts of this invention are active at a temperature as low as 350° F., i.e., temperatures below that of the exhaust gas stream. However, catalyst activity is markedly improved at temperatures of 400° F. and above. Activities at lower temperatures may be obtained when the catalyst is promoted with a second metal. Of course, as the oxidation starts, the heat of reaction serves to raise bed temperatures to a much higher level.

Catalysts of this invention have been tested under actual operating conditions in modern automobiles with excellent results; namely, substantial oxidation of hydrocarbons and carbon monoxide, a discharge exhaust gas substantially free of noxious odors, activity at both high and low temperatures and under a wide variety of operation conditions, resistance to poisons in the exhaust stream. Our catalysts are particularly resistant to poisoning by sulfur compounds commonly found in gasolines. This is an important consideration for current commercial gasolines may contain up to 0.10 percent sulfur, and it could entail a significant expenditure to remove such compounds.

The fuels used during these tests contained a variety of modern fuel additives and the catalysts were remarkably resistant to poisoning from these varied sources. The vehicle tests, conducted under typical urban and country driving conditions, provided an opportunity to investigate the effects of physical and thermal shock on the catalyst material. These tests revealed that in spite of the many shocks and continual agitation, the resistance to attrition of the catalysts of this invention is such that special mechanical contrivances are not required to safeguard the catalyst material. The catalyst is simply put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

To aid the oxidation, secondary air may or may not be introduced into the system. To obtain maximum efficiency, we have found it preferable to introduce secondary air into the system. This is accomplished by the use of a variable speed blower, so that the amount of secondary air varies with operation conditions. The secondary air supply may also be introduced as a natural flow through the use of an appropriate air scoop, ventura, or the like.

Our catalysts can be used to convert the exhaust gas of any gasoline. The gasolines can be of the aliphatic, aromatic and olefin type including both straight run and catalytically produced gasolines and any and all mixtures thereof. The gasolines can contain the usual additives including organolead and other antiknock agents, such as tetraethyllead, tetraphenyllead, tetramethyllead, mixtures of alkylleads, such as tetraethyllead-tetramethyllead mixtures, ferrocene, methylcyclopentadienyl magnanese tricarbonyl, cyclopentadienyl nickel nitrosyl, scavengers, antioxidants, such as aromatic amines and diamines, 2,6-dialkyl- and 2,4,6-trialkyl phenols, dyes, deposit modifiers, including trimethyl phosphate, dimethylphenyl phosphate, and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil and coal furnaces, residual fuel burners, etc.

We claim:

1. The method of substantially oxidizing the hydrocarbon and carbon monoxide constituents of the exhaust gas of internal combustion engines which comprises contacting said exhaust gas together with oxygen with a catalyst composition consisting essentially of a transitional alumina support containing from 0.01 to about 5 weight percent silica and, as a catalytic agent, copper oxide in an amount such that said composition contains from about 0.5 to about 25 weight percent copper and from about 0.5 to about 10 weight percent of at least one promoter metal selected from the group consisting of silver, cobalt, and the combination of cobalt and vanadium, said cobalt and vanadium being in an oxide form.

2. The method of claim 1 wherein said catalytic agent is copper oxide in an amount such that said composition contains from about 0.5 to about 25 weight percent copper and from about 0.5 to about 10 weight percent of silver as a promoter metal.

3. The method of claim 1 wherein said catalytic agent is copper oxide in an amount such that said composition contains from about 0.5 to about 25 weight percent copper and from about 0.5 to about 10 weight percent of cobalt as a promoter metal.

4. The method of claim 1 wherein said catalytic agent is copper oxide in an amount such that said composition contains from about 0.5 to about 25 weight percent copper and from about 0.5 to about 10 weight percent of cobalt and vanadium as a promoter metal.

5. A catalyst composition consisting essentially of a transitional alumina support containing from 0.01 to about 5 weight percent silica and, as a catalytic agent, copper oxide in an amount such that said composition contains from about 0.5 to about 25 weight percent copper and from about 0.5 to about 10 weight percent of at least one promoter metal selected from the group consisting of silver, cobalt, and the combination of cobalt and vanadium, said cobalt and vanadium being in an oxide form.

6. The catalyst composition of claim 5 wherein said catalytic agent is copper oxide in an amount such that said composition contains from about 0.5 to about 25 weight percent copper and from about 0.5 to about 10 weight percent of silver as a promoter metal.

7. The catalyst composition of claim 5 wherein said catalytic agent is copper oxide in an amount such that said composition contains from about 0.5 to about 25 weight percent copper and from about 0.5 to about 10 weight percent of cobalt oxide as a promoter metal.

8. The catalyst composition of claim 5 wherein said catalytic agent is copper oxide in an amount such that said composition contains from about 0.5 to about 25 weight percent copper and from about 0.5 to about 10 weight percent of cobalt and vanadium oxide as a promoter metal.

References Cited

UNITED STATES PATENTS

| | | | |
|---|---|---|---|
| 2,071,119 | 2/1937 | Harger | 23—2 |
| 3,024,593 | 3/1962 | Houdry | 23—2 |
| 2,913,398 | 11/1959 | Riblett et al. | 208—136 |
| 3,133,029 | 5/1964 | Hoekstra | 23—2 X |
| 3,249,558 | 5/1966 | Kearby | 23—2 X |
| 3,282,861 | 11/1966 | Innes | 23—2 X |
| 2,666,756 | 1/1954 | Boyd et al. | 252—474 |

OSCAR R. VERTIZ, Primary Examiner.

ARTHUR GREIF, Assistant Examiner.

U.S. Cl. X.R.

252—454, 463, 474